United States Patent
Barnes (10) Patent No.: US 10,383,196 B1
(45) Date of Patent: Aug. 13, 2019

(54) SYSTEMS AND METHODS FOR CONTROLLING LIGHTING CONDITIONS IN A MANUFACTURING ENVIRONMENT

(71) Applicant: Synapse Wireless, Inc., Huntsville, AL (US)

(72) Inventor: Daniel Josiah Barnes, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/146,840

(22) Filed: Sep. 28, 2018

(51) Int. Cl.
*H05B 37/02* (2006.01)

(52) U.S. Cl.
CPC ..... *H05B 37/0227* (2013.01); *H05B 37/0272* (2013.01)

(58) Field of Classification Search
CPC ............ H05B 37/02; H05B 37/0227; H05B 37/0272; H04L 67/12; H04L 67/125; H04L 49/201
See application file for complete search history.

(56) References Cited

U.S. PATENT DOCUMENTS

| | | | |
|---|---|---|---|
| 7,511,613 B2 | 3/2009 | Wang | |
| 7,970,871 B2 * | 6/2011 | Ewing | G01D 21/00 702/104 |
| 9,014,829 B2 | 4/2015 | Chemel et al. | |
| 9,374,874 B1 | 6/2016 | Ewing | |
| 9,619,989 B1 * | 4/2017 | Ewing | G08B 21/245 |
| 9,907,138 B2 | 2/2018 | Wang et al. | |
| 10,055,958 B2 | 8/2018 | Chen | |
| 2017/0173262 A1 * | 6/2017 | Veltz | A61M 5/1723 |

* cited by examiner

Primary Examiner — Thai Pham
(74) Attorney, Agent, or Firm — Maynard Cooper & Gale, P. C.; Jon E. Holland (57) ABSTRACT

A control system for a facility can automatically control lighting conditions in an area of a facility to prevent the accidental turning off of lights in the area while machines or equipment are operating in the area. The control system can use information from a compressed air system that provides compressed air to the machines in the area to determine if the machines are presently being used in the area. If the machines are being used, the control system can control the lighting conditions in the area to provide a appropriate level of lighting. If the machines are not being used in the area, the control system can control the lighting conditions in the area based on one or more occupancy sensors used to determine if a person is located in the area.

20 Claims, 5 Drawing Sheets

SYSTEMS AND METHODS FOR CONTROLLING LIGHTING CONDITIONS IN A MANUFACTURING ENVIRONMENT

BACKGROUND

The present application generally relates to systems and methods for controlling lighting conditions in a manufacturing environment.

Lighting control systems can be used in a wide variety of commercial and manufacturing applications and environments. A lighting control system can be used with one or more light sources in a facility that are connected, either by a wired or wireless connection, to respective switches, controllers and/or power sources. The lighting control system can use light identifiers to properly identify and control the one or more light sources in a desired manner.

Some lighting control systems can be used to turn on or off light sources or increase or decrease the brightness of the light sources when the presence or absence of a person is detected in a particular area in order to reduce energy costs. The presence or absence of a person in a particular area can be detected with one or more sensors positioned in the area. One drawback to using sensors to determine the presence of absence of a person in an area is that the sensors can sometimes determine that a person is not present in an area (e.g., if the person does not move for a time period) and make corresponding adjustments to the light sources (e.g., dim or turn off the light sources) even though the person is still present in the area. If the area where sensors are used to control the light sources is associated with a manufacturing environment that utilizes operating machines or equipment, an unexpected adjustment to the light sources based on an inaccurate or mistaken sensor reading could pose a significant safety hazard to a person in the area.

SUMMARY

The present application generally pertains to a control system that can control lighting conditions for one or more manufacturing, industrial or commercial environments in a facility. The control system can include a lighting control system and a pneumatic control system. The lighting control system can be used to control the light sources in the facility and the pneumatic control system can be used to control the generation and distribution of compressed gas for equipment or devices located in the facility.

Each of the lighting control system and the pneumatic control system can incorporate sensors that communicate with nodes of the corresponding control system. In some embodiments, the lighting control system and the pneumatic control system can share or use common nodes. The lighting control system can include occupancy sensors that can determine if a person is present is a particular area of the facility. The lighting control system can then increase or decrease the brightness of the light sources in a corresponding area based on whether the occupancy sensor for that same area has indicated that a person is present in the area. The pneumatic control system can include flow sensors that measure the flow of the compressed gas at a particular point in the pneumatic system associated with a particular area of the facility. The pneumatic control system can use the flow data from the flow sensors to determine if equipment or devices in the area are being actively used or in operation, which activity can indicate that a person is present in the corresponding area.

The control system can use the information from both the sensors of the lighting control system and the sensors of the pneumatic control system to control the lighting conditions in the area. The control system can use the information from the occupancy sensors in an area to control the light sources and lighting conditions in the area. However, if the control system receives information from the flow sensors that indicates that a person is present in the area because equipment or machines are being used in the area, the control system can "override" the control instructions for the light sources based on the occupancy sensors or provide new control instructions to the light sources to control the lighting conditions such that lighting conditions are appropriate for a person working in the area with active or operating equipment or devices. When the control system is making occupancy determinations for the area using sensor data from the pneumatic control system, the control system can ignore or discard the sensor data from the lighting control system or prevent the lighting control system from adjusting the lighting conditions in the area based on the occupancy sensors.

One advantage of the present application is that light sources for a manufacturing environment cannot be mistakenly turned off while machines or equipment are operating in the manufacturing environment.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
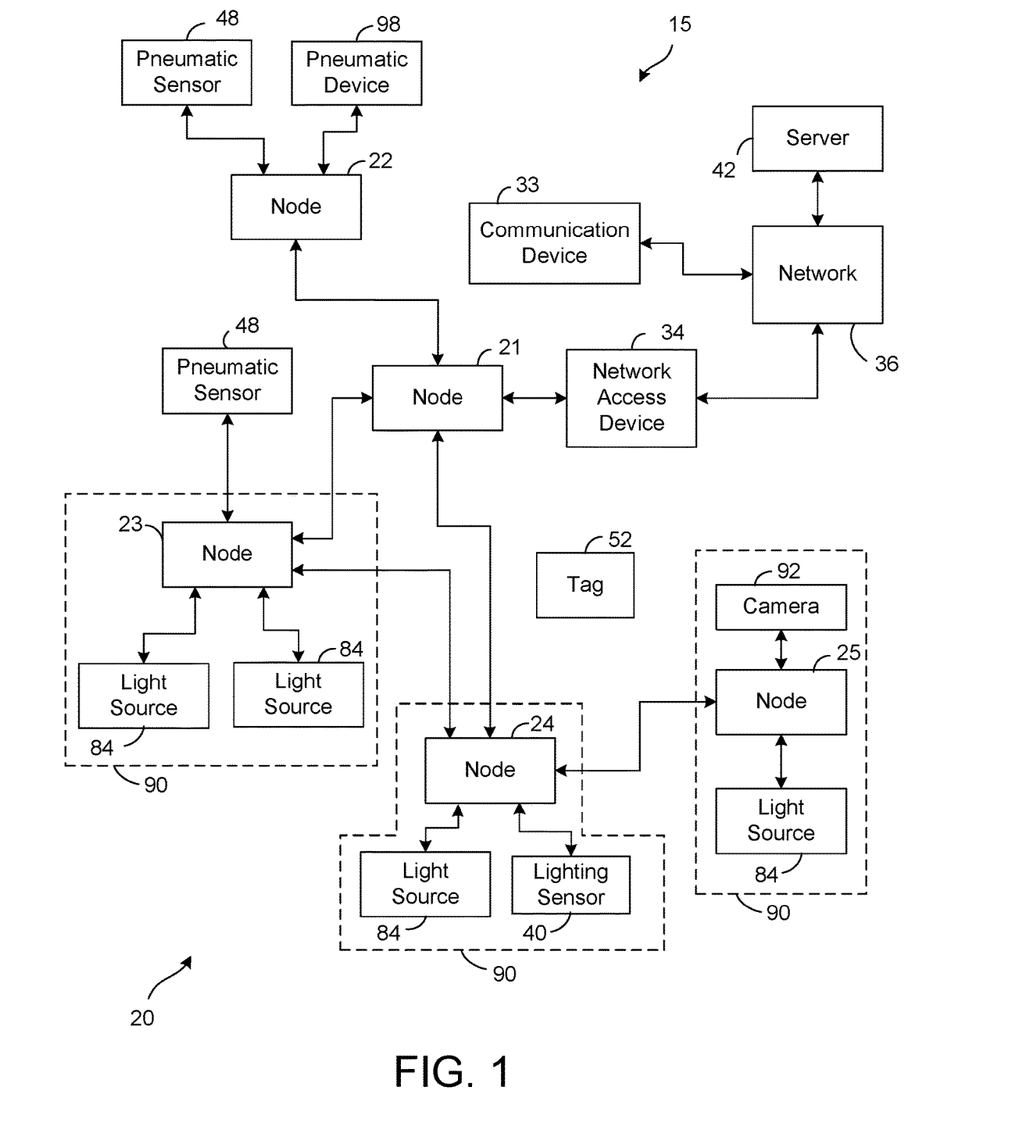
FIG. 1 is a block diagram showing an embodiment of a control system.

FIG. 1 shows an embodiment of a control system 15 at a facility such as a manufacturing plant, office, factory or warehouse. As shown by FIG. 1, the system 15 can include a sensor network 20. In one embodiment, the network 20 can be implemented as a mesh network, but other types of networks may be implemented in other embodiments. Some examples of networks that can be used with the present application are described in: commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

The network 20 can include nodes 21-25 to facilitate communication between a server computer 42 and components of the control system 15. In some embodiments, the nodes 21-25 are configured for wireless communication, but it is possible for any of the nodes 21-25 to communicate via a physical connection (e.g., a wire). In one embodiment, the nodes 21-25 of the control system 15 can be initially configured as a lighting control system to control components of a lighting system (LS) at the facility. In other embodiments, the nodes 21-25 of the control system can be initially configured as a pneumatic control system to monitor and control components of a pneumatic system at the facility or an asset tracking system to locate and identify assets, e.g., people and/or objects, in the facility. An example of an asset tracking system that can be used with the present application is described in: commonly-assigned U.S. Pat. No. 9,619,989, entitled "Asset Tracking Systems and Methods," and granted on Apr. 11, 2017. Regardless of the initial configuration of the nodes 21-25 of the control system 15, the nodes 21-25 of the control system 15 can be configured for operation in one or more of the lighting control system, the pneumatic control system or the asset tracking system.

In one embodiment, the lighting control system, the pneumatic control system and the asset tracking system can each be separate sub-systems of the control system 15 with separate components that operate in conjunction with one another. In another embodiment, the lighting control system, the pneumatic control system and the asset tracking system may use common components (e.g., nodes 21-25) and/or may have common control aspects. For example, the pneumatic control system may be incorporated within the lighting control system such that the systems are able to use some of the same components. In another example, the asset tracking system may be a separate sub-system of the control system 15, but use some or all of the same components used by the lighting control system and the pneumatic control system.

The components of the control system 15 (including the lighting control system, the pneumatic control system and the asset tracking system) can include light sources 84, lighting sensors 40, pneumatic sensors 48, cameras 92, pneumatic devices 98, tags 52, communication devices 33 and any other components used with a lighting control system, a pneumatic control system or an asset tracking system. The lighting sensors 40 can include any combination of optical sensors, proximity sensors, infrared sensors, magnetic sensors, touch sensors, height sensors, temperature sensors, pressure sensors, occupancy sensors or any other appropriate type of sensor. In the embodiment of FIG. 1, five nodes 21-25, four light sources 84, one lighting sensor 40, two pneumatic sensors 48, one tag 52, one communication device 33, one pneumatic device 98 and one camera 92 are depicted for simplicity, but the network 20 may have any number of nodes 21-25, any number of light sources 84, any number of lighting sensors 40, any number of pneumatic sensors 40, any number of tags 52, any number of communication devices 33, any number of pneumatic devices 98, and any number of cameras 92 in other embodiments.

In one embodiment, an occupancy sensor can monitor conditions in an area surrounding the occupancy sensor over some sample period to sense whether a person is present in the area during the sample period. If so, the occupancy sensor can transmit a signal (e.g., a logical high) that indicates the area is occupied. Otherwise, the occupancy sensor transmits a signal (e.g., a logical low) that indicates the area is unoccupied.

There are various techniques that can be used by the occupancy sensor to detect whether the area is occupied. In one embodiment, the occupancy sensor includes an infrared proximity sensor that can detect the presence of an individual based on infrared signals. The occupancy sensor can transmit infrared radiation and measure an amount of infrared radiation that is returned. If there is a change in the profile of the returned infrared radiation, then the occupancy sensor senses movement. In other embodiments, the occupancy sensor can use motion detection, such as a photocell with a Fresnel lens, to detect the movement of light in order to determine if the area is occupied, or the occupancy sensor can use heat signatures to determine if the area is occupied. Yet other techniques are possible in other embodiments.

Each node 21-25 is able to communicate with any of the other nodes 21-25. In one embodiment, the nodes 21-25 can communicate among one another wirelessly, i.e., via electromagnetic or acoustic waves carrying a signal, but it is possible for any of the nodes 21-25 to communicate over a conductive medium, e.g., a wire or fiber, or otherwise. Messages may hop from node-to-node in order to reach a destination. In the embodiment shown by FIG. 1, nodes 21, 23 and 24 are within range of each other such that any of the nodes 21, 23 and 24 can communicate directly with any of the other nodes 21, 23 and 24. However, node 22 is only within range of node 21 and node 25 is only within range of node 24. Nodes 23-25 can use node 21 to route or otherwise transmit a message to node 22 and nodes 21-23 can use node 24 to route or otherwise transmit a message to node 25.

At least one of the nodes 21-25 can be communicatively coupled to a network access device 34 through which the nodes 21-25 communicate in order to access a network 36, such as a local area network (LAN), wide area network (WAN) or the Internet. The network access device 34 can interface messages between the protocol of the network 20 and the protocol of the network 36. The server 42 can be connected to the network 36 to communicate with the nodes 21-25 and components of the network 20 via the network access device 34. The server 42 can be provisioned to know the network configuration, including the network address or identifier of the nodes 21-25, the light address or identifier of the light sources 84, the camera address or identifier of the cameras 92, the pneumatic device address or identifier of the pneumatic devices 98, the pneumatic sensor address or identifier of the pneumatic sensors 48, the tag address or identifier of the tags 52, the communication device address or identifier of the communication devices 33 and any other nodes of the network 20. In other embodiments, the server 42 may be configured to dynamically learn the network configuration.

As shown in the embodiment of FIG. 1, the nodes 23-25 can each be coupled to one or more light sources 84 thereby forming a lighting module 90. The light sources 84 generate light that is used to illuminate the area surrounding the light sources 84. In some embodiments, the light source 84 is assembled into a lamp for use with a lighting fixture. As an example, the light source 84 may be implemented by an incandescent bulb, a light emitting diode (LED), or a fluorescent light, or other types of light sources that are assembled into lamps for use in lighting fixtures. Yet other types of light sources are possible in other embodiments.

The nodes 23-25 can be used to control the lighting state (e.g., the on-state or the off-state), the lighting output aperture position (e.g., all light can exit or a reduced quantity of light can exit), and/or the lighting output intensity (e.g., a high intensity output or a low intensity output) of the corresponding connected light source 84. In addition, the lighting modules 90 may include one or more reflectors that can be adjusted by the nodes 23-25 to change the direction of the light output by the light source 84. Further, the lighting modules 90 may include one or more mechanisms (e.g., a track and motorized trolley) for the light source 84 to permit the position and/or orientation of the light source 84 to be adjusted by the nodes 23-25.

As shown in FIG. 1, the lighting modules 90 can incorporate one or more lighting sensors 40 and/or one or more cameras 92 that are controlled by the corresponding node 23-25 of the lighting module 90. The incorporation of lighting sensors 40 and/or cameras 92 into a lighting module 90 may permit the corresponding node 23-25 of the lighting module 90 to respond directly to certain conditions or events detected by the lighting sensors 40 and/or cameras 92 without having to communicate with the server 42. For example, the detection of a certain condition by lighting sensor 40 (e.g., a person entering a room) may result in the node 23-25 adjusting the light source 84 (e.g., switching the light source 84 to the on-state).

In one embodiment, the nodes 21-25, light sources 84, lighting sensors 40, pneumatic sensors 48, pneumatic devices 98 and cameras 92 can be stationary. However, in other embodiments, one or more of the nodes 21-25, one or more of the light sources 84, one or more of the lighting sensors 40, one or more of the pneumatic sensors 48, one or more of the pneumatic devices 98 and/or one or more of the cameras 92 may be mobile. Each node 21-25, light source 84, lighting sensor 40, pneumatic sensor 48, pneumatic device 98 and camera 92 may be positioned at a specific location within the facility. In one embodiment, the light sources 84 of the lighting modules 90 can be mounted in the ceiling of the facility. However, in other embodiments, the light sources 84 can be mounted in other locations in the facility such as on the walls, under cabinets, in the floor or in any other suitable location. Each node 21-25 may be assigned to a specific location within a facility (e.g., a particular room or area of a building).

One or more of the cameras 92 may be automatically rotated or pivoted either horizontally and/or vertically in order to adjust the field of view of the camera 92 without changing the location of the camera 92. Similarly, one or more of the light sources 84 may be automatically rotated or pivoted either horizontally and/or vertically in order to adjust the output direction of the light source 84 without changing the location of the light source 84. In one embodiment, the rotating or pivoting of the cameras 92 and/or light sources 84 may be pre-programmed into the cameras 92 and/or light sources 84 such that the cameras 92 and/or light sources 84 are rotated or pivoted according to a predetermined sequence. In another embodiment, the rotating or pivoting of the cameras 92 and/or light sources 84 may be in response to instructions provided to the cameras 92 and/or light sources 84 by a user or the control system 15.

The system 15 can also include at least one mobile node, referred to herein as a "tag," 52 that can wirelessly communicate with the nodes 21-25 as the tag 52 is moved through the area(s) of the facility at which the nodes 21-25 are positioned. The tag 52 can be attached to or positioned on an asset (e.g., a person or object) in order to track the movements of the asset. In addition, a tag identifier can be associated with an asset in order to determine the identity of the asset. In one embodiment, the tag 52 can include a processing element to execute instructions for controlling the operation of the tag 52. In addition, the tag 52 can have a communication module for communicating wirelessly with nodes 21-25 and a power supply, such as a battery, to provide electrical power to the components of the tag 52. The tag 52 can be a node of the network 20, but the tag 52 is not configured to route messages through the network 20. In other words, the tag 52 may transmit network messages to and receive network messages from nodes 21-25, but the tag 52 is not used as an intermediate hop for network messages that do not identify the tag 52 as the source or destination for the message in order to conserve the power resources of the tag 52.

In another embodiment, any component or node of the network 20 (e.g., lighting sensors 40, pneumatic sensors 48, cameras 92 and pneumatic devices 98) may be considered a tag 52 depending on the configuration and operation of the component or node. A component or node of the network 20 may be considered a tag 52 if the component or node has a limited power supply (e.g., a battery) and can communicate with nodes 21-25 without being used to route messages through the network 20.

The system 15 can further include at least one communication device 33 that can communicate directly with network 36 and server 42. In another embodiment, the communication device 33 can communicate with the nodes 21-25 as the communication device 33 is moved through the area(s) of the facility. The communication device 33 can be carried by a person (asset) and can be used by the system 15 to track the movements of the person through the facility. The communication device 33 can be used by the person to interact with the lighting control system, the pneumatic control system and/or the asset tracking system of the control system 15 and/or a software application for providing an enhanced experience in the facility. In one embodiment, the communication device 33 can include one or more processors to execute instructions for controlling the operation of the communication device 33. In addition, the communication device 33 can have a communication module for communicating (via a wired or wireless connection) with network 36 and/or nodes 21-25, a location tracking system (e.g., a global positioning system (GPS)) to determine the location of the communication device 33, and a power supply, such as a battery, to provide electrical power to the components of the communication device 33. The communication device 33 can have an input/output (I/O) interface, such as, for example, a touch screen display of a smart phone or tablet computer, or a mouse, keyboard, and monitor of a laptop computer, that permits the user to input data into the communication device 33 and receive data from the communication device 33.

Figure 2:
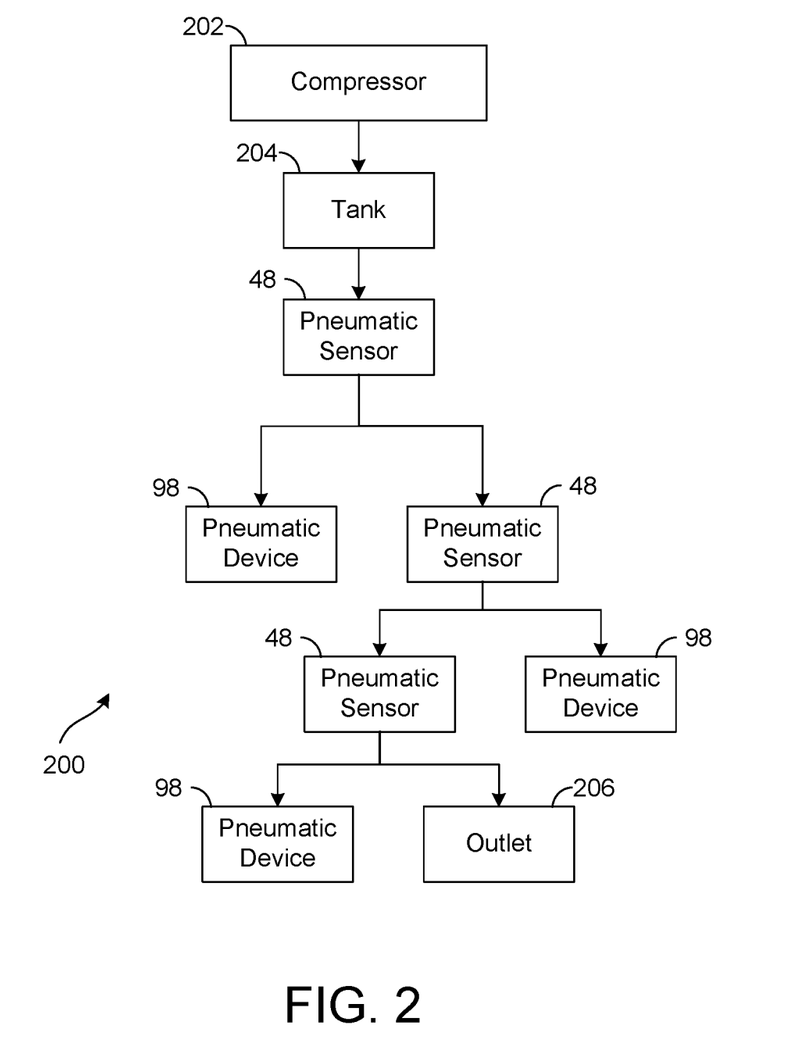
FIG. 2 is a block diagram showing an embodiment of a pneumatic system.

FIG. 2 depicts an embodiment of a compressed gas system or pneumatic system that can be used at a facility such as a manufacturing plant, office, factory or warehouse. The pneumatic system 200 can include a compressor 202 to compress (i.e., increase the pressure of) a gaseous fluid. In one embodiment, the fluid can be air, but other types of gases or fluids (e.g., inert gases) can be used in other embodiments. The compressor 202 can receive air (or other gas) from a return line and/or from the surrounding environment (e.g., the atmosphere). The compressor 202 can increase the pressure of the received air from a first pressure (e.g., ambient or atmospheric air pressure) to a second preselected pressure that is greater than the first pressure. The compressed air from the compressor 202 can be provided to and stored in a tank 204 until needed by the components of the pneumatic system 200. The tank 204 can be used to maintain the compressed air at the second preselected pressure and provide the compressed air to the pneumatic devices 98 and/or other components of the pneumatic system 200. While not shown in FIG. 2, the pneumatic system 200 may include other components (e.g., vales) to provide for appropriate operation of the pneumatic system 200.

The tank 204 can be connected to the pneumatic devices 98 and air outlets 206 of the pneumatic system 200 by suitable connections, conduits, pipes, ducts, etc., to permit flow of the compressed air between the tank 204 and the pneumatic devices 98 and the air outlets 206. In addition, pneumatic sensors 48 can be positioned at predetermined locations within the pneumatic system 200 to measure parameters associated with the performance and/or operation of the pneumatic system 200. In the embodiment of FIG. 2, one compressor 202, one tank 204, three pneumatic sensors 48, three pneumatic devices 98 and one outlet 206 are depicted for simplicity, but the pneumatic system 200 may have any number of compressors 202, any number of tanks 204, any number of pneumatic sensors 48, any number of pneumatic devices 98 and any number of outlets 206 in other embodiments.

In one embodiment, pneumatic devices 98 can include manufacturing equipment (e.g., automation/robotic systems, painting systems, injection molding systems, and food and beverage processing system) or other equipment (e.g., abrasive blasting systems) that require a compressed air source. In one embodiment, the compressor 202 and tank 204, while shown as separate components in FIG. 2, may be considered pneumatic devices 98 and communicate with the nodes 21-25 of the network 20. In another embodiment, the pneumatic devices 98 (including the compressor 202 and the tank 204) may include one or more pneumatic sensors 48 to provide information regarding the operation and/or performance of the corresponding pneumatic devices 98.

In one embodiment, outlet 206 can include any suitable connection mechanism to permit portable pneumatic equipment or devices (e.g., power tools such as air hammers, drills and wrenches or medical/dental tools) to be connected to the pneumatic system 200 and receive compressed air from the pneumatic system 200. In an embodiment, pneumatic sensors 48 can include flow sensors, pressure sensors, temperature sensors, current sensors, voltage detectors, infrared sensors, or any other suitable type of sensors to measure parameters that can be used to evaluate the performance or operation of pneumatic devices 98 and/or the pneumatic system 200. In one embodiment, the pneumatic sensors 48 can be used to measure parameters associated with the flow of compressed air in the pneumatic system 200. The pneumatic sensors 48 used to measure flow can be located internal to, external to, or in-line with the connections between the compressor 202, the tank 204 and the pneumatic devices 98 or outlets 206.

Figure 3:
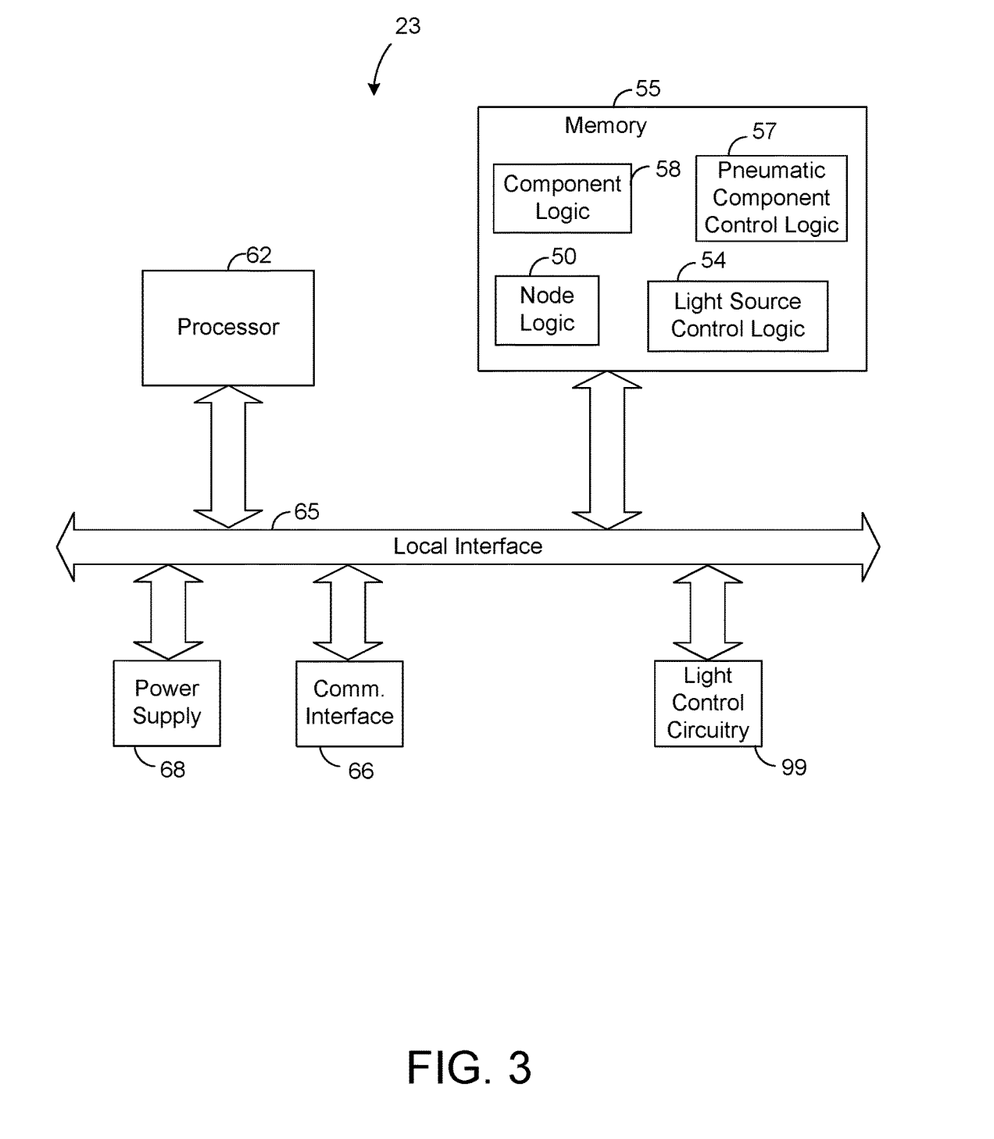
FIG. 3 is a block diagram showing an embodiment of a network node used with the control system.

FIG. 3 depicts an embodiment of one of the nodes used in network 20. Note that any of the other nodes may be configured similarly or identical to the node depicted by FIG. 3. The node 23 shown by FIG. 3 can include logic 50, referred to herein as "node logic," for generally controlling the operation of the node 23. The node 23 also includes logic 54, referred to herein as "light source control logic," for controlling the light sources 84 connected to the node 23, logic 57, referred to herein as "pneumatic component control logic," for controlling the pneumatic sensors 48 and/or pneumatic devices 98 connected to the node 23 and, if desired, component logic 58 for controlling any component (e.g., tag 52, camera 92 and/or lighting sensor 40) that may be connected to the node 23. In other embodiments, the component logic 58 and/or the pneumatic component control logic 57 can be combined with light source control logic 54 to control light sources 84, pneumatic sensors 48, pneumatic devices 98 and/or components. The node logic 50, component logic 58, the pneumatic component control logic 57 and the light source control logic 54 may be implemented in software, firmware, hardware, or any combination thereof. In FIG. 3, the node logic 50, the component logic 58, the pneumatic component control logic 57 and the light source control logic 54 are implemented in software and stored in memory 55. However, other configurations of the node logic 50, the component logic 58, the pneumatic component control logic 57 and the light source control logic 54 are possible in other embodiments.

Note that the node logic 50, the component logic 58, the pneumatic component control logic 57 and the light source control logic 54, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 23 includes at least one conventional processor 62, which includes processing hardware for executing instructions stored in the memory 55. As an example, the processor 62 may include a central processing unit (CPU) or a digital signal processor (DSP). The processor 62 communicates to and drives the other elements within the node 23 via a local interface 65, which can include at least one bus.

The node 23 also has a communication interface 66. The communication interface 66 includes a radio frequency (RF) radio or other device for communicating with the components of the network 20. Using the communication interface 66, the node 23 may communicate with a tag 52, a pneumatic sensor 48, a pneumatic device 98, another node 21, 22, 24, 25, a camera 92, a lighting sensor 40, a light source 84, a communication device 33 or a network access device 34.

The node 23 can have a power supply 68, which provides electrical power to the components of the node 23 and possibly to the light source 84, camera 92, pneumatic sensor 48 and/or lighting sensor 40. In one embodiment, the power supply 68 has an interface that allows it to plug into or otherwise interface with an external component, such as a wall outlet or battery, and receive electrical power from such external component. If desired, the power supply 68 may incorporate one or more batteries to permit the node 23 to be independent of the external power component.

The node 23 can also have light control circuitry 99 that is connected, either wired or wirelessly, to the light source 84 to control the light source 84. In one embodiment, light control circuitry 99 can control: the lighting state (e.g., the on-state or the off-state) of the light source 84; the brightness or lighting output (e.g., a high intensity output or a low intensity output) of the light source 84; the position and/or orientation of the light source 84; the output color of the light source 84; the output direction of light from the light source and/or the position of the output aperture of the light source 84. The output aperture can be opened or closed to control the amount of light output by the light source 84. For example, the output aperture having a more closed position would limit the amount of light output by the light source 84, while a more open position for the output aperture would permit an increased light output by the light source 84. In the light source 84, the high intensity output can correspond to greater than 50% of the maximum brightness or intensity of the light source 84 and the low intensity output can correspond to less than 50% of the maximum brightness or intensity of the light source 84. If a node is connected to more than one light source 84 (e.g., node 23), then the light control circuitry 99 can either have separate circuits for each light source 84 or the light control circuitry 99 can use circuits that can control multiple light sources 84.

The light control circuitry 99 may include a switch and/or light driver through which current from power supply 68 is provided to the light source 84. Alternatively, the light control circuitry 99 may control a switch and/or light driver located near the light source 84 to permit current from a light source power supply to reach the light source 84. In one embodiment, the switch can be manually controlled and can be mounted in the vicinity of the light source 84, such as on the wall of a room containing the light source 84. The light source 84 can convert the current received through the switch into visible light for illuminating the area in close proximity to the light source 84. The light source control logic 54 can be used to control the light control circuitry 99 to obtain desired performance from the light source 84. For example, the light source control logic 54 can activate the switch in the light control circuitry 99 to turn on the light source 84 or increase the brightness of the light source 84 in response to a determination that a person has entered the room containing the light source 84.

Figure 4:
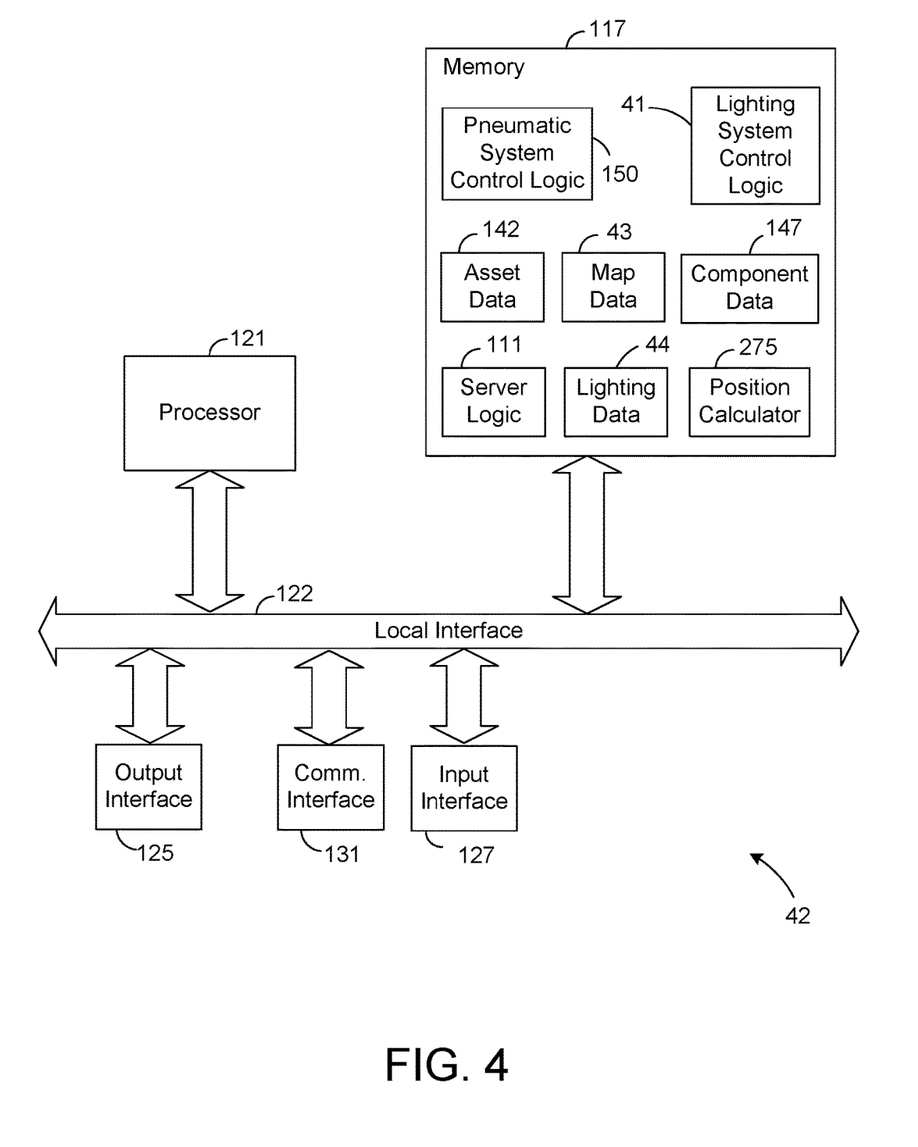
FIG. 4 is a block diagram showing an embodiment of a server used with the control system.

FIG. 4 shows an embodiment of the server 42. The server 42 can include logic 111, referred to herein as "server logic," for generally controlling the operation of the server 42, including communicating with the nodes 21-25 of the network 20. The server 42 also includes logic 275, referred to herein as a "position calculator," to calculate the position of each asset in the facility. The server 42 includes logic 41, referred to herein as "lighting system control logic" to control the lighting modules 90 and the light sources 84, and logic 150, referred to herein as "pneumatic system control logic," to control the components of the pneumatic system 200. The server logic 111, the pneumatic system control logic 150, lighting system control logic 41 and the position calculator 275 can be implemented in software, hardware, firmware or any combination thereof. In the server 42 shown in FIG. 4, the server logic 111, the pneumatic system control logic 150, lighting system control logic 41 and the position calculator 275 are implemented in software and stored in memory 117 of the server 42. Note that the server logic 111, the pneumatic system control logic 150, lighting system control logic 41 and the position calculator 275, when implemented in software, can be stored and transported on any non-transitory computer-readable medium for use by or in connection with an instruction execution apparatus that can fetch and execute instructions.

The server 42 can include at least one conventional processor 121, which has processing hardware for executing instructions stored in memory 117. As an example, the processor 121 may include a central processing unit (CPU) or a digital signal processor (DSP). The processor 121 communicates to and drives the other elements within the server 42 via a local interface 122, which can include at least one bus. Furthermore, an input interface 127, for example, a keypad, keyboard or a mouse, can be used to input data from a user of the server 42, and an output interface 125, for example, a printer, monitor, liquid crystal display (LCD), or other display apparatus, can be used to output data to the user. Further, a communication interface 131 may be used to exchange data with the network 36.

As shown by FIG. 4, asset data 142, lighting data 44, map data 43 and component data 147 can be stored in memory 117 at the server 42. The component data 147 can include image data from cameras 92, tag data from tags 52, sensor data from lighting sensors 40 and/or pneumatic sensors 48 and/or information or data from pneumatic devices 98 for use and/or analysis by server logic 111, pneumatic system control logic 150, position calculator 275 and/or lighting system control logic 41. In one embodiment, the data from the pneumatic sensors 48 and the information or data from pneumatic devices 98 can be stored in memory as pneumatic data (not shown) for use and/or analysis by the pneumatic system control logic 150 or the lighting system control logic 41.

The asset data 142 can indicate information about the assets (e.g., people, objects and equipment) in the facility, such as the approximate location (e.g., room or area) and identity of each asset. The asset data 142 can also include a lighting profile for each asset. Each asset's lighting profile can specify lighting conditions for one or more areas of the facility that are to be used when the asset is determined to be in the corresponding area. The areas of the facility that do not have specified lighting conditions in a lighting profile for the asset can be controlled according to the lighting control system logic 41. The specified lighting conditions can include a configuration for each light source 84 associated with the area. The configuration of a light source 84 can include settings relating to one or more of the lighting state, the brightness of light, the position and/or orientation, the output color, the output direction of light, and/or the position of the output aperture of the light source 84.

The map data 43 can indicate the layout of the facility or environment, such as, for example, a floor plan or map of a building in which the system 15 is installed. The floor plan or map has a coordinate system and includes locations of objects (e.g., cameras 92, sensors 40, light sources 84 and nodes 21-25), rooms, departments and/or areas.

The lighting data 44 can indicate one or more parameters for each lighting module 90 in the system 15. In this regard, each lighting module 90 can be identified in the lighting data 44 by the module's respective network identifier for the network 20 (i.e., the network address for the node 23-25) or other unique identifier. For each lighting module 90, the lighting data 44 can identify the number of light sources 84 associated with the lighting module 90 and indicate an identifier for each light source 84. If a lighting module 90 is limited to a single light source 84 or a single light identifier, then the network identifier may be used as the light identifier. In one embodiment, the server logic 111 can transmit messages with information relating to the lighting data 44 to the lighting modules 90 over the network 20. Additional information regarding the operation of a lighting control system is described in commonly-assigned U.S. Pat. No. 9,374,874, entitled "Lighting Control Systems and Methods," and granted on Jun. 21, 2016, which patent is incorporated herein by reference. In one embodiment, the lighting data 44 may also store the lighting profile for each asset.

The position calculator 275 can receive component data 147, information from camera 92 and/or other information relating to an asset and then use map data 43 to determine the location of the asset in the facility and the identity of the asset. In one embodiment, the position calculator 275 can determine the identity and/or location of an asset using computer vision logic (not shown) and the information from the cameras 92. In other embodiments, if the asset or person has a tag 52, the position calculator 275 may use the communication of the tag 52 with nodes 21-25 to determine the location of the tag 52. Additional information regarding the determination of the location of an asset using a tag 52 that can be used with the present application is described in commonly-assigned U.S. Pat. No. 9,619,989, entitled "Asset Tracking Systems and Methods," and granted on Apr. 11, 2017. In still another embodiment, the position calculator 275 can determine the location of an asset using data from communication device 33.

Once an asset's location and/or identity is determined, the position calculator 275 can update the asset data 142 to indicate the asset's location and/or identity. The server 42 can be used to determine the location and identity of each asset (e.g., person or object) in the facility and then adjust the lighting conditions in the area of the asset based on a corresponding lighting profile associated with the asset.

To implement the lighting conditions indicated by the lighting profile for the asset, the server 42 notifies the lighting system control logic 41 that an identified asset has a new location in the facility based on asset data 142, either from entering the facility or changing locations in the facility. The lighting system control logic 41 then retrieves the lighting profile for the asset from the asset data 142 and/or the lighting data 44 to determine if the lighting profile for the identified asset has lighting conditions corresponding to the location of the identified asset. If the lighting profile for the asset does not have any lighting conditions for the designated area of the asset, then the lighting system control logic 41 controls the lighting modules 90 and light sources 84 according to the parameters provided in the lighting system control logic 41. However, if the lighting profile does have corresponding lighting conditions for the location of the identified asset, then the lighting system control logic 41 generates the appropriate instructions for the corresponding lighting modules 90 and light sources 84 to implement the selected lighting conditions from the lighting profile. The lighting system control logic 41 can then transmit the appropriate instructions to the corresponding lighting modules 90 and light sources 84 over the network 20. Upon receiving the instructions from the lighting system control logic 41, the lighting modules 90 can implement the received instructions to obtain the desired output lighting from the light sources 84.

The pneumatic system control logic 150 can be used to analyze and process the data from the pneumatic sensors 48 and the information or data from pneumatic devices 98 stored in component data 147. The pneumatic system control logic 150 can use the data and information from the pneumatic sensors 48 and/or the pneumatic devices 98 to monitor and/or control the operation of the pneumatic system 200. For example, the pneumatic system control logic 150 can use the data and information from the pneumatic sensors 48 and the pneumatic devices 98 to identify problems with the components of the pneumatic system 200 (e.g., a fault occurring at the compressor 202). In addition, the pneumatic system control logic 150 can use the data and information from the pneumatic sensors 48 and the pneumatic devices 98 to control the capacity (or operation) of the compressor 202 in response to changing load conditions in the pneumatic system 200 (e.g., increase capacity of the compressor 202 in response to high demand in the pneumatic system 200). In one embodiment, the pneumatic system control logic 150 can be used to provide instructions to the lighting system control logic 41 to control lighting conditions in an area of the facility based on the data and information from the pneumatic sensors 48 and the pneumatic devices 98.

Figure 5:
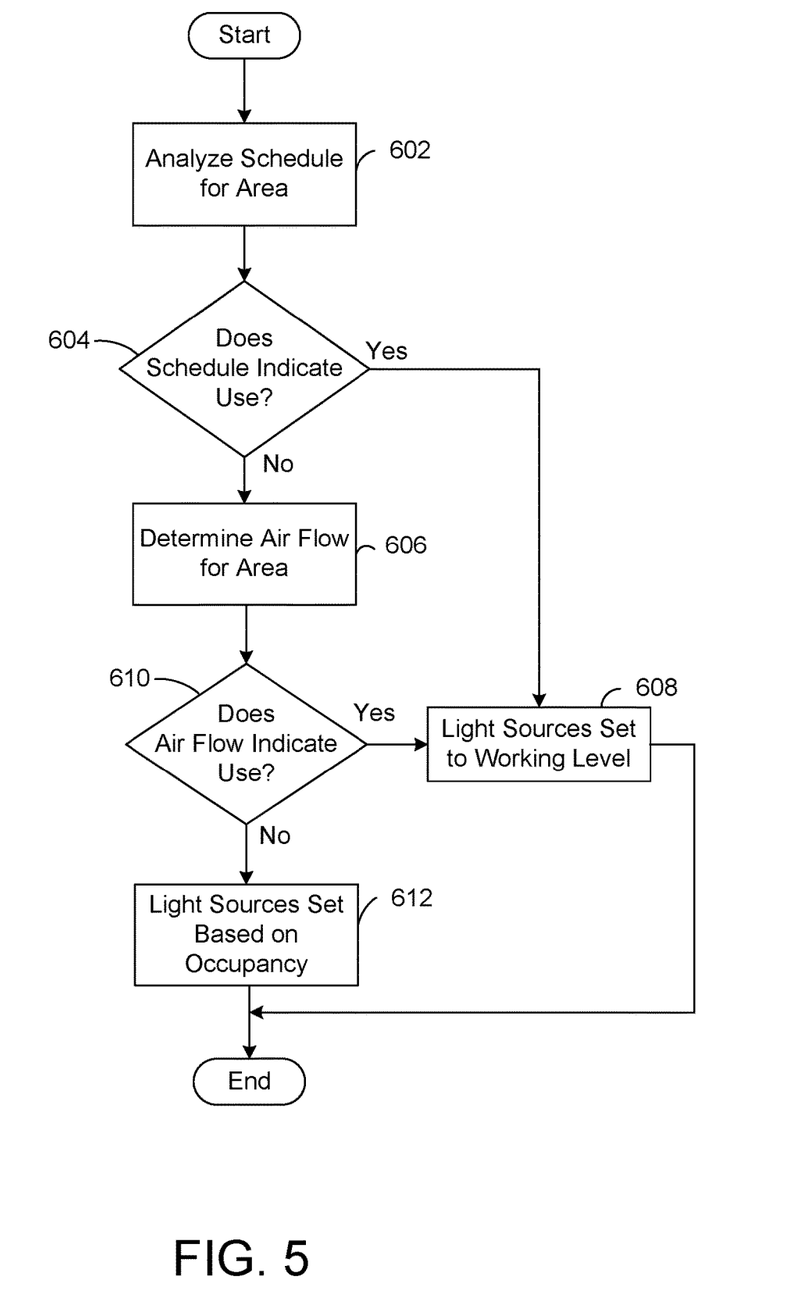
FIG. 5 is a flow chart showing an embodiment of a process for controlling lighting conditions in an area.

FIG. 5 is a flow chart showing an embodiment of a process for controlling lighting conditions in an area of a facility having one or more pneumatic devices 98. The process begins with the server 42 receiving data or information related to a production or working schedule for the pneumatic devices 98 associated with the area of the facility (e.g., a manufacturing environment). The production or working schedule can indicate the days and times when the pneumatic devices 98 for the area are intended to be operational. The information on the working schedule for the pneumatic devices 98 can be stored in lighting data 44, in component data 147 (as part of the pneumatic data), as part of a lighting profile for the pneumatic devices 98 or the area, or manually entered by a user. The server 42 can then analyze the production or working schedule for the corresponding pneumatic devices 98 located in the area (step 602). The server 42 can then determine from the production schedule information whether the pneumatic devices 98 are scheduled for use (step 604).

If the production schedule does indicate that the one or more pneumatic devices 98 in the area are scheduled for use, the server 42 can control the light sources 84 in the area to a "working level" that provides lighting conditions appropriate for an active manufacturing environment (step 608) and the process can end. However, if the production schedule does not indicate that the one or more pneumatic devices 98 are scheduled for use, the server 42 can then determine the air flow of the pneumatic system 200 in the area (step 606). The server 42 can use the data and information provided by the pneumatic sensors 48 and/or the pneumatic devices 98 associated with the area to determine information about the air flow in the area. For example, if the one or more pneumatic devices 98 are operating in the area, the pneumatic system 200 can have significant air flow in that area. In contrast, if the one or more pneumatic devices 98 are not operating in the area, the pneumatic system 200 can have little or no air flow in that area.

Depending on the air flow demands of the pneumatic devices 98 in the area, the information about the air flow in the area may be collected for a predetermined time period (e.g., 30 seconds) or may be based on an instantaneous measurement. The instantaneous measurement of the air flow can be used to identify sudden and large increases in the air flow (e.g., pulses) in the area, which can correspond to a pneumatic device 98 being in operation and drawing on the compressed air supply. In contrast, the collection of air flow information for a predetermined time period may provide a more accurate indication of pneumatic devices 98 being used in the area because the larger time period for measurement (in contrast to an instantaneous measurement) can measure more "pulses" or draws on the compressed air supply, which may more reliably indicate that one or more pneumatic devices 98 are in operation in the area.

After determining the appropriate information relating to air flow for the pneumatic system 200 in the area, the server 42 can then determine if the air flow for the pneumatic system 200 in the area indicates that the one or more pneumatic devices 98 are being used in the area (step 610). The use of the one or more pneumatic devices 98 in the area can be an indication that a person is present in the area. In one embodiment, the determination of whether the one or more pneumatic devices 98 are being used in the area can be based on a comparison of the amount of air flow for the pneumatic system 200 in the area (either at an instant or over a predetermined time period) to a corresponding predetermined threshold amount or a corresponding prior amount of air flow to determine changes in the amount of air flow.

In another embodiment, the server 42 may use a machine learning algorithm to analyze the air flow data for the pneumatic system 200 in the area and determine when pneumatic devices are being used in the area. As known in the art, machine learning algorithms generally involve training a computer through the use of artificial intelligence by analyzing sample data sets to recognize data patterns that likely result in certain outputs or outcomes. Such machine learning algorithms may be used by the server 42 to learn air flow patterns or usages that correspond to the use of pneumatic devices 98 in the area. For example, the machine learning algorithm may identify a pattern of pulses of air flow that corresponds to the operation of a pneumatic device 98 in the area. In still other embodiments, other evaluations can be performed on the air flow data for the area to determine the use of pneumatic devices in the area.

If the level of air flow in an area indicates that the one or more pneumatic devices are being used, the server 42 can control or set the light sources 84 in the area to the working level that provides lighting conditions appropriate for an active environment (step 608) and the process can end. However, if the level of air flow in an area does not indicate that the one or more pneumatic devices 98 are being used or active, the server 42 can control or set the light sources 84 in the area to a level determined by the lighting system control logic 41 based on measurements from one or more lighting sensors 40 (e.g., occupancy sensors) associated with the area (step 612) and the process can end.

In one embodiment, the one or more lighting sensors 40 can be used to determine if a person is present in the area. The lighting system control logic 41 can control or set the light sources 84 in the area to provide a first level of lighting based on a determination that a person is in the area and a second level of lighting based on a determination that a person is not in the area (or has left the area). In one embodiment, the first level of lighting may be the same as the working level of lighting, but the first level of lighting may be different in other embodiments. The second level of lighting can correspond to a reduced level from the first level of lighting and may correspond to the light sources 84 in the area being switched to the "off" position or dimmed.

In an embodiment, the process of FIG. 5 can be used to operate the light sources 84 in a manufacturing environment at a working level of lighting regardless of a lighting level determination by the lighting system control logic 41 based on measurements from lighting or occupancy sensors 40 in the area. In other words, the server 42 can maintain the light sources 84 at a working level of lighting in the area even if occupancy sensors 40 for the area indicate that no person is present in the area.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A control system for a facility, comprising:
    at least one light source connected to a first node of a network, the at least one light source operable to generate visible light to illuminate an area of the facility having at least one pneumatic device;
    at least one pneumatic sensor connected to a second node of the network, the at least one pneumatic sensor configured to measure a parameter corresponding to a flow of compressed gas in the area of the facility; and
    a server connected to the network, the server configured to control the lighting configuration of the at least one light source based on whether a person is located in the area of the facility, the server configured to determine whether a person is located in the area of the facility based on the measured parameter corresponding to a flow of compressed gas in the area of the facility from the at least one pneumatic sensor.

2. The control system of claim 1, wherein the server is configured to analyze information related to a production schedule for the at least one pneumatic device in the area of the facility, the production schedule indicating when the at least one pneumatic device is intended to be operational, the server is configured to control the lighting configuration of the at least one light source based on the analyzed information related to the production schedule.

3. The control system of claim 1, wherein the server is configured to control the lighting configuration of the at least one light source to a first configuration when a person is determined to be in the area of the facility and to control the lighting configuration of the at least one light source to a second configuration different from the first configuration when a person is determined to be absent from the area of the facility.

4. The control system of claim 1, further comprising at least one lighting sensor, the at least one lighting sensor configured to measure a parameter associated with the area of the facility, the server configured to determine whether a person is located in the area of the facility based on the measured parameter from the at least one lighting sensor.

5. The control system of claim 4, wherein the server is configured to determine whether a person is located in the area of the facility based on the measured parameter from the at least one lighting sensor when the server determines that no person is located in the area of the facility based on the measured parameter from the at least one pneumatic sensor.

6. The control system of claim 1, wherein the server is configured to compare the measured parameter corresponding to the flow of compressed gas in the area of the facility from the at least one pneumatic sensor to a predetermined threshold value to determine whether a person is located in the area of the facility.

7. The control system of claim 1, wherein the server is configured to use machine learning techniques in conjunction with the measured parameter corresponding to the flow of compressed gas in the area of the facility from the at least one pneumatic sensor to determine whether a person is located in the area of the facility.

8. A method for controlling lighting conditions in a facility, the method comprising:
    measuring a first parameter associated with at least one pneumatic sensor within a pneumatic system;
    determining a flow of compressed gas in an area of the facility based on the measured first parameter from the at least one pneumatic sensor;
    determining whether at least one pneumatic device is operating in the area of the facility based on the determined flow of compressed gas;
    measuring a second parameter associated with at least one lighting sensor within a lighting system;
    determining whether a person is present in the area of the facility based on the measured second parameter from the at least one lighting sensor;

controlling a lighting configuration of at least one light source in the area of the facility based on the determined operation of the at least one pneumatic device; and controlling the lighting configuration of the at least one light source in the area of the facility based on the determined presence of a person in the area of the facility when the determined operation of the at least one pneumatic device indicates that the at least one pneumatic device is not operating.

9. The method of claim 8, further comprising:

analyzing information related to a production schedule for the at least one pneumatic device in the area of the facility, the production schedule indicating when the at least one pneumatic device is intended to be operational; and controlling the lighting configuration of the at least one light source in the area of the facility based on the analyzed information related to the production schedule.

10. The method of claim 8, wherein the controlling the lighting configuration of the at least one light source based on the determined operation of the at least one pneumatic device includes controlling the lighting configuration of the at least one light source to a first configuration in response to the determination that the at least one pneumatic device is operating.

11. The method of claim 10, wherein the controlling the lighting configuration of the at least one light source in the area of the facility based on the determined presence of a person in the area of the facility includes:

controlling the lighting configuration of the at least one light source to the first configuration in response to the determination that a person is present in the area of the facility; and controlling the lighting configuration of the at least one light source to a second configuration different from the first configuration in response to the determination that a person is not present in the area of the facility.

12. The method of claim 8, wherein the measuring the first parameter associated with the pneumatic system includes measuring the flow of compressed gas in the pneumatic system for one of a predetermined time period or an instant in time.

13. The method of claim 8, wherein the determining whether the at least one pneumatic device is operating in the area includes comparing the determined flow of compressed gas to a predetermined threshold value.

14. The method of claim 8, wherein the determining whether at least one pneumatic device is operating in the area includes using machine learning techniques in conjunction with the determined flow of compressed gas to determine whether the at least one pneumatic device is operating.

15. A control system for a facility, comprising:

a plurality of nodes connected together in a network;

a server connected to the plurality of nodes, the server comprising a lighting control system and a pneumatic control system;

the pneumatic control system comprising:

at least one pneumatic device located in an area of the facility and connected to a pneumatic system to receive compressed gas;

at least one pneumatic sensor connected to a first node of the plurality of nodes, the at least one pneumatic sensor configured to measure a parameter corresponding to a flow of compressed gas to the at least one pneumatic device; and a first processor configured to determine whether a person is located in the area of the facility based on the measured parameter from the at least one pneumatic sensor; and the lighting control system comprising:

at least one light source connected to a second node of the plurality of nodes, the at least one light source operable to generate visible light to illuminate the area of the facility;

at least one lighting sensor connected to the second node of the plurality of nodes, the at least one lighting sensor configured to measure a parameter corresponding to a person being present in the area of the facility;

a second processor configured to control a lighting configuration of the at least one light source in response to the determination from the first processor that a person is located in the area of the facility; and the second processor further configured to determine whether a person is located in the area of the facility based on the measured parameter from the at least one lighting sensor and configured to control the lighting configuration of the at least one light source based on the determination of whether a person is located in the area of the facility when the first processor determines that the measured parameter from the at least one pneumatic sensor indicates a person is not located in the area of the facility.

16. The control system of claim 15, wherein at least one of the first processor or the second processor is configured to analyze information related to a production schedule for the at least one pneumatic device, the production schedule indicating when the at least one pneumatic device is intended to be operational, the second processor is configured to control the lighting configuration of the at least one light source based on the analyzed information related to the production schedule.

17. The control system of claim 15, wherein the second processor is configured to control the lighting configuration of the at least one light source to a first configuration when a person is determined to be in the area of the facility and to control the lighting configuration of the at least one light source to a second configuration different from the first configuration when a person is determined to not be in the area of the facility.

18. The control system of claim 15, wherein the first processor is configured to compare the measured parameter from the at least one pneumatic sensor to a predetermined threshold value to determine whether a person is located in the area of the facility.

19. The control system of claim 15, wherein the first processor is configured to use machine learning techniques in conjunction with the measured parameter from the at least one pneumatic sensor to determine whether a person is located in the area of the facility.

20. The control system of claim 15, wherein the at least one pneumatic sensor is configured to measure the flow of compressed gas to the at least one pneumatic device for one of a predetermined time period or an instant in time.

* * * * *